United States Patent

Magnusson et al.

[15] 3,683,117

[45] Aug. 8, 1972

[54] SELECTOR NETWORK WITH SCANNING- AND ESTABLISHING FUNCTION

[72] Inventors: Bengt Gunnar Magnusson, Enskede; Theodor Gosta Neovius, Hagersten, both of Sweden

[73] Assignee: Telefonaktiebolaget L. M. Ericsson, Stockholm, Sweden

[22] Filed: Sept. 24, 1970

[21] Appl. No.: 74,953

[30] Foreign Application Priority Data

Oct. 3, 1969 Sweden ..................13625/69

[52] U.S. Cl. ..............................................179/18 GF

[51] Int. Cl. ..............................................H04q 3/49

[58] Field of Search ..................................179/18 GF

[56] References Cited

UNITED STATES PATENTS 3,573,388 4/1971 Dagnall .................179/18 GF 3,414,679 12/1968 Regnier .................179/18 GF

*Primary Examiner*—Kathleen H. Claffy

*Assistant Examiner*—William A. Helvestine

*Attorney*—Hane, Baxley & Spiecens

[57] ABSTRACT

There is disclosed a selector network working according to the so-called end marking principle and using selector matrices of crossing point type wherein each crossing point is provided with a switching arrangement for performing scanning-, establishing- and reidentifying functions between an initial point side and an end point side.

If the holding wire of the end point side is idle, upon an establishing signal from the initial point, supplied during said scanning- and establishing function on the control wire, a first bistable logic circuit is switched and the establishing signal is transmitted to the control wire on the end point side. One path is found to the marked end point. If the first bistable logic circuit is in switched state which remains independently of the condition of the holding wire, upon a busy marking signal supplied at the end point on the holding wire, a second bistable logic circuit is switched and the busy marking signal is transmitted to the holding wire at the initial point side and speech-and re-identification gates are activated. The second bistable logic circuit remains in its switched position independently of the resetting of the first bistable logic circuit and the activated gates connect the speech wires for the two speech directions and the control wires for a reidentifying signal from the end point to the initial point.

6 Claims, 4 Drawing Figures

Figure 1:
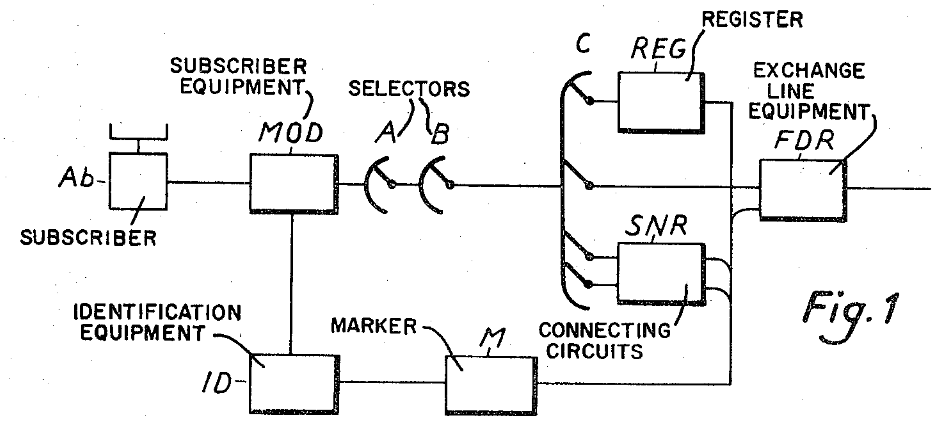

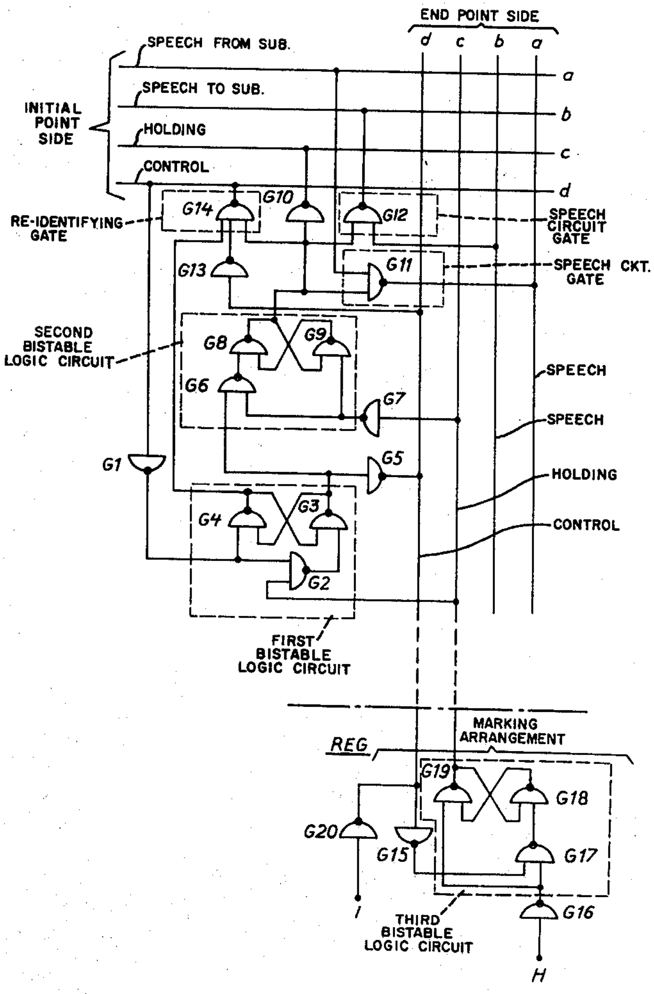
END POINT SIDE
d c b a
SPEECH FROM SUB.
SPEECH TO SUB.
INITIAL POINT SIDE
HOLDING
CONTROL
a
b
c
d
G14
G10
G12
RE-IDENTIFYING GATE
SPEECH CIRCUIT GATE
G13
G11
SPEECH CKT. GATE
SECOND BISTABLE LOGIC CIRCUIT
G8
G9
G6
G7
SPEECH
SPEECH
G1
G5
HOLDING
G4
G3
CONTROL
G2
FIRST BISTABLE LOGIC CIRCUIT
REG
MARKING ARRANGEMENT
G19
G18
G20
G15
G17
THIRD BISTABLE LOGIC CIRCUIT
G16
I
H INVENTORS
BENGT GUNNAR MAGNUSSON
THEODOR GÖSTA NEOVIUS
BY Hane, Baxley and Spiecens
ATTORNEYS INVENTORS
BENGT GUNNAR MAGNUSSON
THEODOR GÖSTA NEOVIUS
BY Hane, Baxley and Spiecens
ATTORNEYS INVENTORS
BENGT GUNNAR MAGNUSSON
THEODOR GÖSTA NEOVIS
BY Hane, Barfley and Spiessens
ATTORNEYS

SELECTOR NETWORK WITH SCANNING- AND ESTABLISHING FUNCTION

The present invention relates to a selector network working according to the so called end marking principle with a scanning- and establishing function, intended to be used in a telecommunication system provided with markers and built up of a number of selector matrices consisting of rows and columns, connections being established via the selector matrices from an initial point, for example a subscriber's equipment, marked by a marker to an end point, for example a cord- or connecting circuit, marked by the marker.

In conventional telecommunication plants the selector network is built up by means of electromechanical elements. Hence, the speed of the establishing process is limited by the slowness of the movable parts of the electromechanical elements. Since nowadays, to an increasing extent, electronic control devices are used, for example registers and markers, it is desirable that the selectors also be electronic, so that the control devices are not occupied for too long a time in each establishing process. If in a telephone exchange the speech is transmitted, for example, by means of pulse width modulation, it is possible to use electronic gates as selector elements. This method will however be uneconomic, particularly in small exchanges, because, in order to be able to carry out so called reidentifying, a relatively large store is required to register the selector positions, and furthermore because the controlling of the selector setting requires a large calculation unit.

An object of the present invention is to provide a selector network with electronic gates, in which the above mentioned disadvantages are eliminated. According to the invention the so-called end marking principle is used wherein the connections are established from a given initial point to a given end point marked in a suitable way. This principle is known per se for selector networks for analog signals, where, by means of bistable elements arranged in matrices, for example four-layer rectifiers, upon each establishing of a connection setting up of all the routes leading to the end point is initiated, and when, through one of the routes the required connection has been established, the other routes are disconnected (compare e.g. the Swedish Pat. No. 309,436). According to the invention, however, only one route is always established and furthermore a far greater reliability in operation is obtained by the use of logical circuits than in the known arrangements. Furthermore the above mentioned reidentifying can be carried out in a simple manner.

Figure 2:
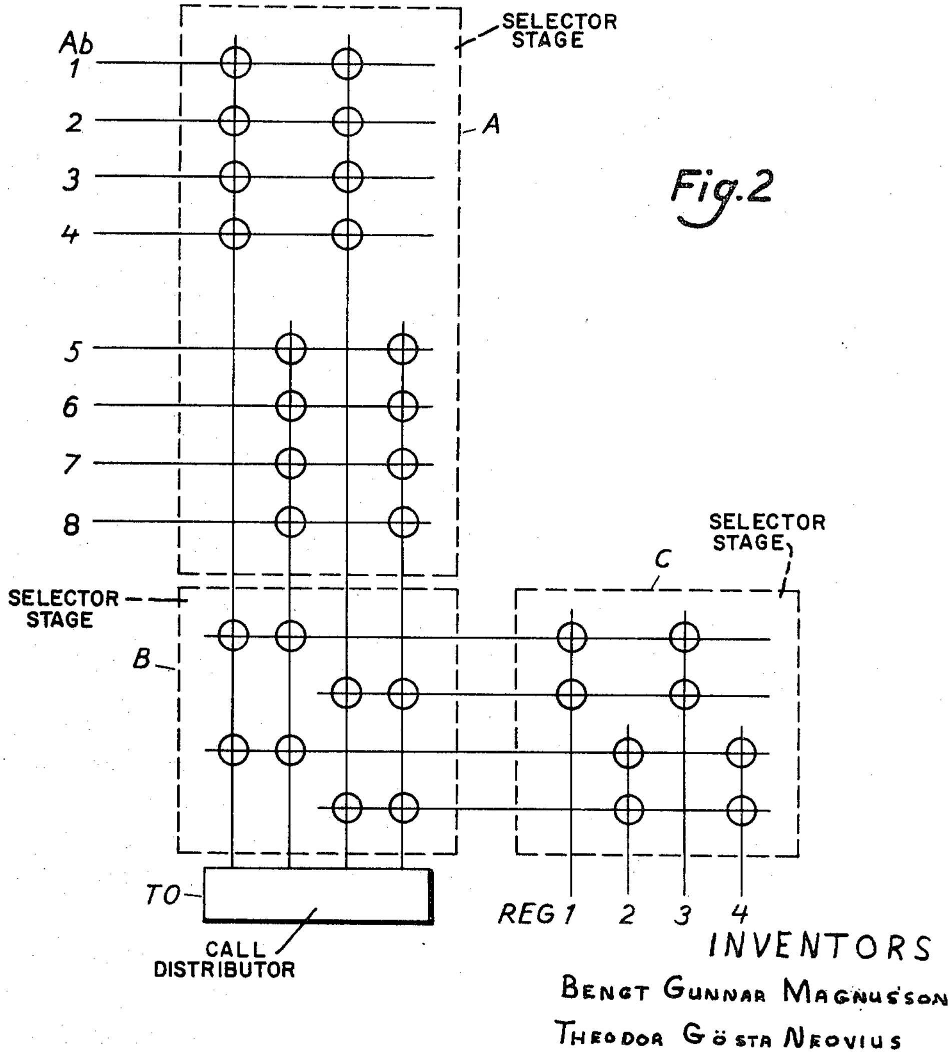
Figure 3:
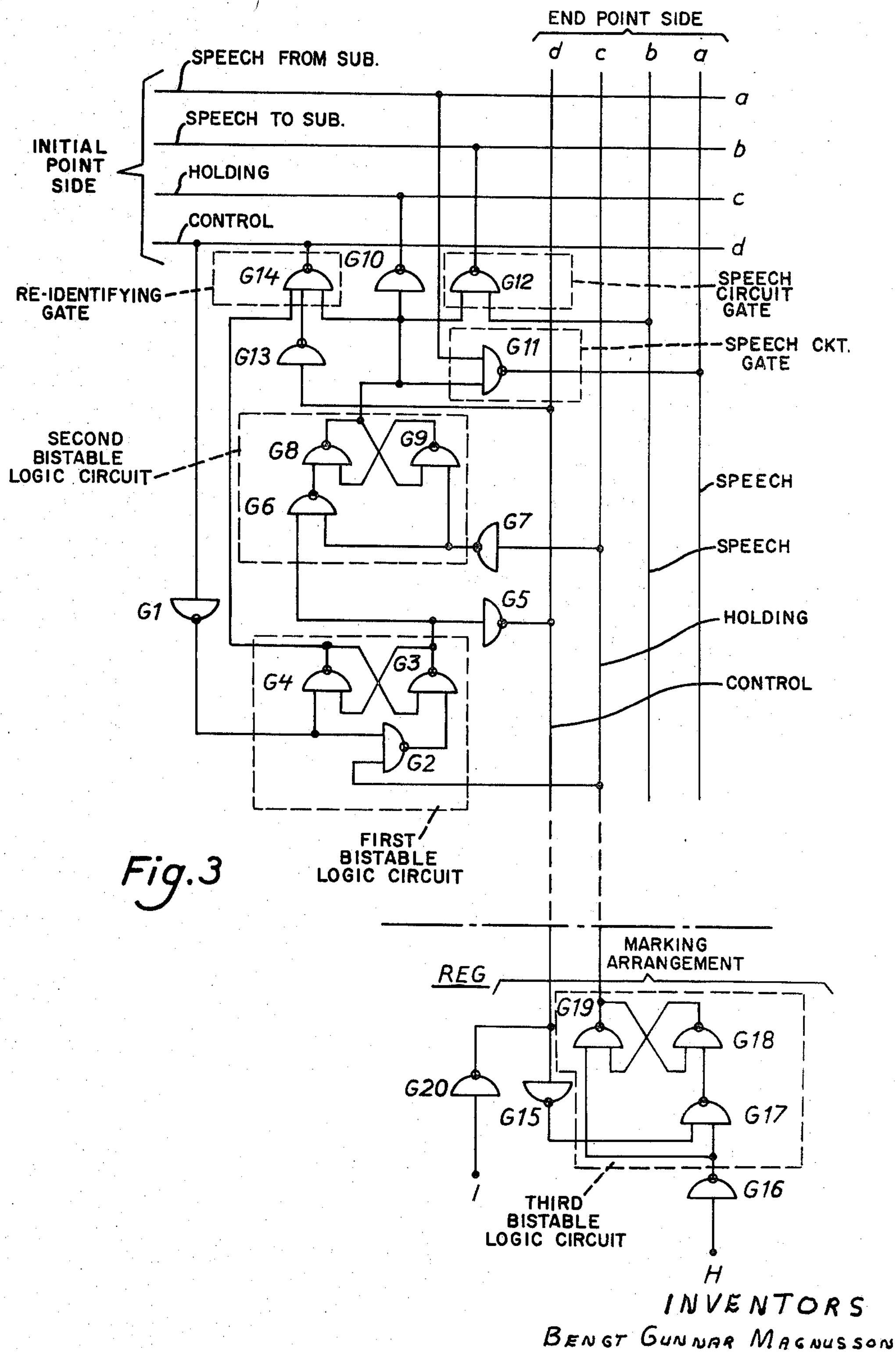
Figure 4:
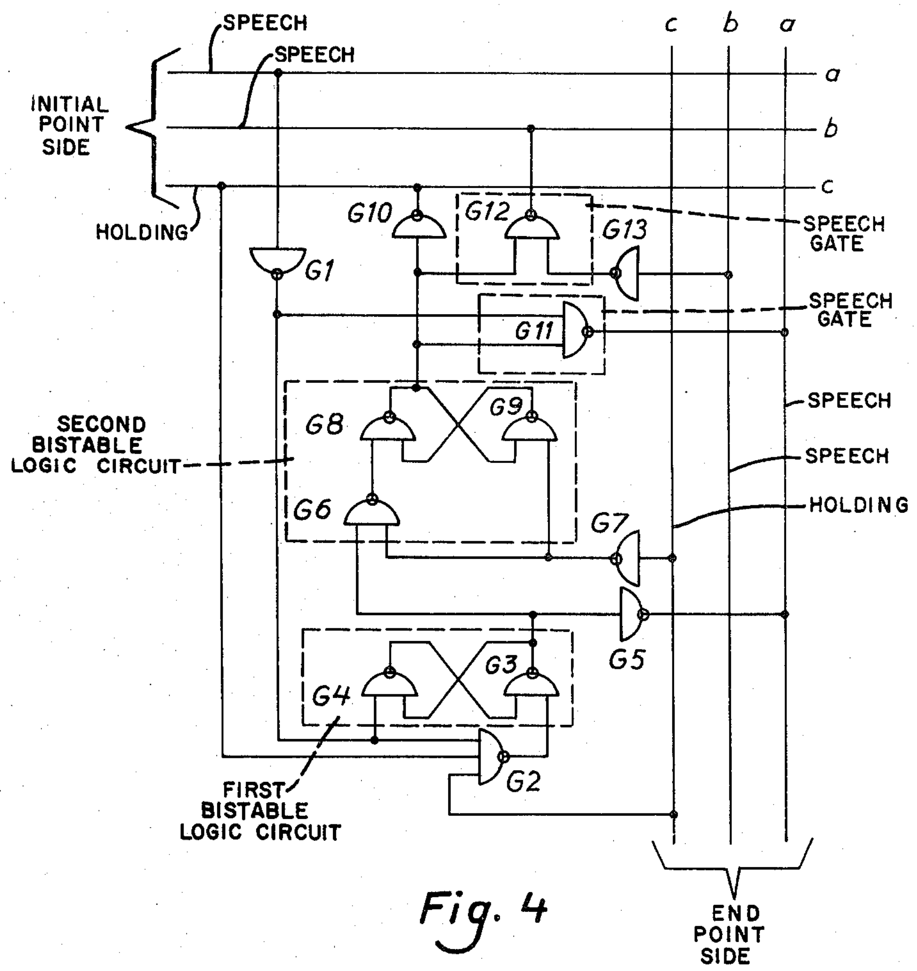

The invention, the characteristics of which appear from the accompanying claims, will be described in more detail in connection with the accompanying drawing, in which FIG. 1 shows a block diagram of a subscriber's exchange utilizing the selector network according to the invention, FIG. 2 shows a selector network according to the invention, and FIGS. 3 and 4 show examples of how the interconnection points of the selector network can be constructed.

In FIG. 1, showing a block diagram of a subscriber's exchange, reference Ab denotes a subscriber, connected to a subscriber's equipment MOD, which also comprises modulation- and demodulation devices, for example for pulse width modulation and demodulation respectively. The subscriber's equipment is via three selector stages A, B and C connectable to a register REG, connecting circuits SNR or exchange line equipments FDR. The exchange also comprises an identification equipment ID for identifying subscriber's equipments and a marker M. The exchange operates in the following manner: When a subscriber lifts his handset for calling the exchange, his multiple position is identified by the identifier ID. The identifier, which is working with some type of cyclic scanning, stops at the position of the subscriber and calls the marker. Since now a new identifying and not a reidentifying is to be carried out the marker selects an idle register. The extension and the register are selected from the marker and the corresponding connection is established through the selector network.

When the extension is connected to the register REG and receives an audible signal from there, the wanted number is dialled. The number may either relate to a connection to an exchange line or a connection to another extension.

For a connection to an exchange line the register REG calls the marker M after one digit. From the marker M, via the register REG, a voltage is applied to a wire in the established telephone communication. The identifier ID is started by the marker and hunts out the wire to which this voltage is applied and has thereby reidentified the multiple position of the extension. The marker now releases the register REG, selects an idle exchange line equipment FDR and selects this equipment and the position of the extension, a new connection being established through the selector stages.

Upon setting up a connection to another extension the register REG also calls the marker, when the dialling is terminated. At first the register transmits the number of the called extension to the marker. The marker starts the identifier ID for hunting out the corresponding multiple position. If, upon such a test, the extension is found to be idle, the marker selects an idle connecting circuit SNR and selects this connecting circuit and the called extension, connection being established between them. After this, reidentifying of the calling extension takes place, the register REG is released, the calling extension and the other side of the connecting circuit SNR are selected and a connection is established also between these two points, after which the connection is ready.

In FIG. 2 there is schematically shown how according to the invention the selector stages A, B and C in FIG. 1 are constructed. As appears from the figure the stages consist of matrices in which crossing points, where interconnection is possible, have been marked by circles. At the circles for interconnection, logical connecting networks are arranged, the construction of which is shown in FIGS. 3 and 4. According to the FIG. 2 it is assumed that a number of subscribers Ab 1–8 are connected to the rows of the A-stage and, via the interconnection points of the A-stage, the B-stage and the C-stage, are connectable to the columns of the C-stage. For the sake of clearness only four of these columns are shown, which are assumed to be connected to the registers REG 1–4. Furthermore the selector network comprises a call distributor TO whose purpose is to select one of the possible connections and whose function will be explained with reference to the subsequent figures. According to the description of FIG. 1 the selector network carries out two different establishing processes, firstly setting up a connection from a certain subscriber to a definite device in the exchange (register, connecting circuit or exchange line equipment), secondly reidentifying of a subscriber which has been connected to such a device. How this is carried out will be explained with reference to the embodiments of the matrix crossing points shown in FIG. 3 and 4, FIG. 3 showing a four wire selector network and FIG. 4 showing a three wire selector network.

In FIG. 3, in which the horizontal rows are presumed to be directed to the subscriber's terminals or initial point side, references *a* and *b* respectively denote the speech wires of the selector network, the wire *a* being used for transmission from the subscriber and the wire *b* being used for transmission towards the subscriber. The wire *c* constitutes a holding wire, the condition of which indicating whether the connection is busy or not and wire *d* constitutes a control wire for controlling the connection processes. The crossing point furthermore comprises a number of gates G1–G14, constituted by so called NAND-gates, i.e., AND-gates with inverting outlets. In the operating description following below it is furthermore assumed that a binary ONE on the *c*-wire indicates that the corresponding row or column is idle, while a ZERO indicates that it is busy. In a corresponding way a ONE on the d-wire indicates that no control process is taking place. This ONE on the horizontal *d*-wire is inverted by the gate G1 to set the first bistable logic circuit consisting of the gates G2, G3 and G4 to ZERO, i.e., the output of the gate G3 is ZERO and that of the gate G4 is ONE. In a corresponding way the second bistable logic circuit consisting of the gates G6, G8, G9 is set to ZERO by the ONE-condition of the vertical *c*-wire, said ONE-condition being inverted in the gate G7. When a calling subscriber, which is assumed to be connected to the horizontal rows, is selected by the marker the condition of the d-wire of the initial point side is changed to ZERO. If the vertical *c*-wire of the end point side connected to an input of gate G2 whose other input is connected to gate G1 has a ONE-condition, i.e., is idle, the first bistable logic circuit will be switched, so that a ONE is obtained at the outlet of the gate G3 and a zero is transmitted via the gate G5 to the vertical *d*-wire. This process will be repeated for the succeeding crossing points and if there are idle routes a ZERO will be obtained on the *d*-wire of all the outlets in the C-stage. The circuits for each such outlet comprise a marking arrangement including a third bistable logic circuit comprising gates G17, G18 and G19, and gates G15, G16 and G17 acting as inverters. It is assumed the shown marking arrangement is in the register marked by the marker and the marking consists of a binary ZERO supplied to the inlet H. When ZERO-conditions are obtained on the *d*-wire of the end point side the third bistable logic circuit will be switched so that a ZERO is obtained at the outlet of the gate G19 connected to the c-wire of the end point side. This busy marking of the *c*-wire will be sent back through the selector network via those crossing points, where the first bistable logic circuit has been switched so that the second bistable logic circuit is switched due to the fact that the gate G6 thereof obtains a ONE at both of its inlets. The switching of the bistable logic circuit causes a ZERO to be obtained on the horizontal c-wire of the initial point side via the gate G10. When the busy marking has reached the calling subscriber in this way the connection is established since the ONE-setting of the second bistable logic circuit also causes the speech wires to be through-connected via the speech circuit gates G11 and G12. The *d*-wire is then reset to ONE-condition by the marker. If reidentifying of a subscriber connected to a particular register is wanted it is only necessary to set the *d*-wire to ZERO at the register from the inlet I, (inlet I is connected via gate G20 to the d-wire) whereby this ZERO-setting will be sent to the subscriber extension via the gate G13 and the reidentifying gate G14 opened by the first and second bistable logic circuits. As appears from the above description all the routes if there are a number of them leading to the same register will be busy. In order to avoid this condition there is a so called call distributor TO (FIG. 2), by means of which all the columns but one in the selector stages A and B which are idle and connectable to the subscribers via the existing logical circuits are marked busy, when the control wire *d* is activated, only one connection being established via the stage A.

In FIG. 4 there is shown how the crossing point shown in FIG. 3 may be built up with use of only three wires. This crossing point arrangement comprises speech gates G11 and G12; the first bistable logic circuit comprising gates G3 and G4; the second bistable logic circuit comprising gates G6, G8 and G9; the inverting gates G1, G5, G7, G10 and G13; and the logic gate G2. The control function of the control wire *d* of FIG. 3 upon establishing a connection is provided in this embodiment by means of the speech wire *a* which is connected to the gates G1 and G5. Furthermore, the gates G13 and G14 used for reidentifying have been eliminated. The reidentifying is carried out instead via the speech wire *b*. Moreover the gate G2 has been provided with a third inlet connected to the horizontal *c*-wire in order to prevent the first bistable logic circuit from being influenced by the speech signals.

By means of the above described selector networks, a reliable selector system with scanning- and connecting function is thus obtained, where reidentifying can be carried out easily. It should furthermore be pointed out that the desired in the crossing points of the selector network can be obtained with a large number of various solutions of the circuit arrangements and that the above shown embodiments only constitute examples.

We claim:

1. In a selector network a switching arrangement for a crossing point between a first group of wires having first ends adapted to be connected to an initial point and a second group of wires having first ends adapted to be connected to an end point in a connecting network, each group comprising a holding wire adapted to receive a first or a second voltage potential for indicating whether the respective group is busy or idle, respectively, a first speech wire adapted to carry speech signals supplied at the initial point, a second speech wire adapted to carry speech signals supplied at the end point and a control wire to which, at the initial point side, said first voltage potential is supplied when a connection is to be established between wires of the same type in the respective groups and to which control wire, at the end point side, said first voltage potential is supplied when an established connection is to be reidentified, said switching arrangement comprising first and second bistable logic circuits, each of said bistable logic circuits having first and second inputs and an output means, first and second means for connecting the first and second inputs, respectively, of said first bistable logic circuit to the holding wire of said second group and the control wire of said first group, respectively, one of said first and second means being a signal inverting means, third means for connecting the output means of said first bistable logic circuit to the control wire of said second group, fourth and fifth means for connecting the first and second inputs, respectively, of said second bistable logic circuit to the output means of said first bistable logic circuit and to the holding wire of said second group, respectively, sixth means for connecting the output means of said second bistable logic circuit to the holding wire of said first group, first and second speech gates, each of said speech gates having first and second inputs and an output, seventh and eighth means for connecting the outputs of said first and second speech gates, respectively, to the first speech wire of said second group and the second speech wire of said first group, respectively, ninth and 10th means for connecting the first inputs of said first and second speech gates, respectively, to the first speech wire of said first group and the second speech wire of said second group, respectively, 11th means for connecting the output means of said second bistable logic circuit to the second input of each of said speech gates, a reidentification gate having an output connected to the control wire of said first group and first, second and third inputs, 12th and 13th means for connecting the output means of said first and second bistable logic circuits, respectively, to the first and second inputs of said reidentification gate, and fourteenth means for connecting the control wire of said second group to the third input of said reidentification gate.

2. The selector network of claim 1, further including a reidentification terminal adapted to receive the first voltage potential from a marker for reidentifying an established connection, means for connecting said reidentification terminal to the control wire of said second group and a marking arrangement comprising a third bistable logic circuit having first and second inputs and an output means, means for connecting the first input of said third bistable logic circuit to the control wire of said second group, means for connecting the output means of said third bistable logic circuit to the holding wire of said second group, and a marking terminal adapted to receive the first voltage potential from the marker, and means for connecting said marking terminal to the second input of said third bistable logic circuit;

3. The selector network of claim 1 wherein said speech gates perform at least an AND-function.

4. In a selector network a switching arrangement for a crossing point between a first group of wires having first ends adapted to be connected to an initial point and a second group of wires having first ends adapted to be connected to an end point in a connecting network, each group comprising a holding wire adapted to receive a first or a second voltage potential, respectively, for indicating whether the respective group is busy or idle, respectively, a first speech wire adapted to carry speech signals supplied at the initial point and to which, at the initial point side, said first potential is supplied when a connection is to be established between wires of the same type in the respective groups, and a second speech wire adapted to carry speech signals supplied at the end point, and to which speech wire, at the end point side, said first potential is supplied when an established connection is to be reidentified, said switching arrangement comprising first and second bistable logic circuits, each of said logic circuits having first and second inputs and an output means, an inverting gate having first and second inputs and an output connected to the first input of said first logic circuit, means for connecting each of said holding wires to a different one of the inputs of said inverting gate, means for connecting the first speech wire of said first group to the second input of said first bistable logic circuit, means for connecting the output means of said first bistable logic circuit to the first speech wire of said second group and to the first input of said second bistable logic circuit, means for connecting the second input of said second logic circuit to the holding wire of said second group, first and second speech gates, each of said speech gates having first and second inputs and an output, means for connecting the output means of said second bistable logic circuit to the first inputs of each of said speech gates and to the holding wire of said first group, means for connecting the first speech wire of said first group to the second input of said second speech gate, means for connecting the second speech wire of said second group to the second input of said first speech gate, means for connecting the output of said first speech gate to the second speech wire of said first group, and means for connecting the output of said second speech gate to the first speech wire of said second group.

5. The selector network of claim 4 wherein said speech gates perform at least an AND-function.

6. The selector network of claim 4 wherein said inverting gate performs at least an AND-function.

* * * * *